United States Patent
Monga et al.

(10) Patent No.: US 11,397,634 B1
(45) Date of Patent: Jul. 26, 2022

(54) DETECTING DATACENTER MASS OUTAGE WITH NEAR REAL-TIME/OFFLINE USING ML MODELS

(71) Applicant: Oracle International Corporation, Redwood Shores, CA (US)

(72) Inventors: Amarpal Singh Monga, Issaquah, WA (US); Bin Chen, Redmond, WA (US); Alex Edward Hamilton, Yarrow Point, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/338,478

(22) Filed: Jun. 3, 2021

(51) Int. Cl.
| | |
|---|---|
| *G06F 11/00* | (2006.01) |
| *G06F 11/07* | (2006.01) |
| *G06F 16/23* | (2019.01) |
| *G06F 11/22* | (2006.01) |

(52) U.S. Cl.
CPC ...... *G06F 11/0769* (2013.01); *G06F 11/0709* (2013.01); *G06F 11/079* (2013.01); *G06F 11/0754* (2013.01); *G06F 11/2252* (2013.01); *G06F 11/2257* (2013.01); *G06F 16/2379* (2019.01)

(58) Field of Classification Search
CPC ............... G06F 11/079; G06F 11/0709; G06F 11/0769; G06F 11/0754; G06F 11/225; G06F 11/2252; G06F 1/28; H04L 41/0645; H04L 41/0631; H04L 41/0677; H04L 41/069
See application file for complete search history.

(56) References Cited

U.S. PATENT DOCUMENTS

| | | | | |
|---|---|---|---|---|
| 10,055,277 | B1* | 8/2018 | Niederman | G06F 11/0751 |
| 11,176,016 | B1* | 11/2021 | Pandit | G06F 11/0772 |
| 11,252,014 | B2* | 2/2022 | Moser | H04L 43/0805 |
| 2004/0262409 | A1* | 12/2004 | Crippen | H05K 7/20727 |
| | | | | 165/80.3 |
| 2019/0207822 | A1* | 7/2019 | Di Pietro | H04L 41/145 |
| 2019/0228296 | A1* | 7/2019 | Gefen | G06F 11/079 |
| 2021/0026724 | A1* | 1/2021 | Nadger | G06F 11/3006 |
| 2021/0067401 | A1* | 3/2021 | Abe | H04L 41/0622 |

(Continued)

OTHER PUBLICATIONS

Lin, Jieyu et al., Automated Anomaly Detection and Root Cause Analysis in Virtualized Cloud Infrastructures, 2016, IEEE/IFIP (Year: 2016).*

(Continued)

*Primary Examiner* — Marc Duncan
(74) *Attorney, Agent, or Firm* — Kilpatrick Townsend & Stockton LLP

(57) ABSTRACT

The present embodiments relate to data center outage detection and alert generation. An outage detection service as described herein can process near real-time data from various sources in a datacenter and process the data using a model to determine one or more projected sources of a detected outage. The model as described herein can include one or more machine learning models incorporating a series of rules to process near-real time data and offline data and determine one or more projected sources of an outage. An alert message can be generated to provide the projected sources of the outage and other data relevant to the outage.

17 Claims, 10 Drawing Sheets

(56) References Cited

U.S. PATENT DOCUMENTS

2022/0027257 A1* 1/2022 Harutyunyan ...... G06F 11/3419

OTHER PUBLICATIONS

Dandona, Divyaansh et al., Graph Based Root Cause Analysis in Cloud Data Center, 2020, IEEE (Year: 2020).*
Soldani, Jacopo et al., Anomaly Detection and Failure Root Cause Analysis in (Micro)Service-Based Cloud Applications: A Survey, University of Pisa, May 26, 2021 (Year: 2021).*

* cited by examiner

US 11,397,634 B1

DETECTING DATACENTER MASS OUTAGE WITH NEAR REAL-TIME/OFFLINE USING ML MODELS

BACKGROUND

A datacenter can include a plurality of computing devices (e.g., servers) configured to perform various processing tasks and associated devices to power the computing devices and connect the computing devices to external devices. Servers can be arranged in racks with a number of servers, where the servers in the rack are powered by a rack power supply. Conditions within the datacenter (e.g., temperature, humidity) can be controlled and monitored (e.g., using sensors and climate control devices) to prevent overheating or loss of functionality of the servers in the datacenter.

However, for any of a variety of reasons, an outage in the datacenter can occur. The outage can include any loss of functionality of any computing devices in the datacenter, such as a loss of functionality of an application executing on servers or overheating and shutdown of servers, for example. Such an outage can result in lower user experience in interacting with devices and/or applications executing by devices in the datacenter. Accordingly, an operator maintaining the datacenter may want to efficiently identify a source of the outage and resolve the issue causing the outage. However, as more devices and applications are implemented in a datacenter, efficiently identifying the source of the outage can become increasingly difficult.

SUMMARY

The present embodiments relate to detecting datacenter mass outages with near real-time data using one or more models. A first exemplary embodiment provides a method performed by a cloud infrastructure node for deriving one or more projected sources of an outage in a datacenter. The method can include obtaining a set of input data providing various parameters relating to a datacenter and a listing of devices and applications executing on devices in the datacenter. The method can also include detecting an outage of at least one functionality of the datacenter. The outage can result from a loss of a functionality (e.g., an application) or a loss of computing resources (e.g., lost connection to server(s), loss of power to server(s)).

The method can also include processing the set of input data using a model to derive one or more projected sources of the outage. The model can incorporate a plurality of rules specifying correlations between the set of input data and the devices or the applications executing on the devices as the one or more projected sources of the outage. The method can also include generating an outage notification message providing the one or more projected sources of the outage.

A second exemplary embodiment relates to a cloud infrastructure node. The cloud infrastructure node can include a processor and a non-transitory computer-readable medium. The non-transitory computer-readable medium can include instructions that, when executed by the processor, cause the processor to obtain a set of input data providing various parameters relating to a datacenter and a listing of devices and applications executing on devices in the datacenter. The instructions can further cause the processor to detect an outage of a functionality of the datacenter.

The instructions can further cause the processor to derive, by a model using the set of input data, one or more projected sources of the outage. Deriving the one or more projected sources of the outage can include generating, using a set of rules accessible to the model, a predicted level for each parameter included in the set of input data using historical data relating to each parameter. Deriving the one or more projected sources of the outage can include comparing the predicted level for each parameter with an actual level of each parameter included in the set of input data to identify one or more anomalous parameters that include actual levels with a threshold deviation from each corresponding predicted level. Deriving the one or more projected sources of the outage can include identifying one or more devices and/or an application that corresponds to each of the identified anomalous parameters. Each of the identified one or more devices and/or the application is included as the one or more projected sources of the outage. The instructions can further cause the processor to generate an outage notification message providing the one or more projected sources of the outage.

A third exemplary embodiment relates to a non-transitory computer-readable medium. The non-transitory computer-readable medium can include stored thereon a sequence of instructions which, when executed by a processor causes the processor to execute a process. The process can include obtaining a set of input data providing various parameters relating to a datacenter. The process can also include detecting an outage at the datacenter. The process can also include deriving, by a model using the set of input data, one or more projected sources of the outage.

Deriving the one or more projected sources of the outage can include comparing a predicted level for each parameter with a derived level of each parameter included in the set of input data to identify one or more anomalous parameters that include derived levels with a threshold deviation from each corresponding predicted level. Deriving the one or more projected sources of the outage can also include identifying one or more devices and/or an application that corresponds to each of the identified anomalous parameters. Each of the identified one or more devices and/or the application is included as the one or more projected sources of the outage. The process can also include generating an outage notification message providing the one or more projected sources of the outage.

DETAILED DESCRIPTION

Figure 1:
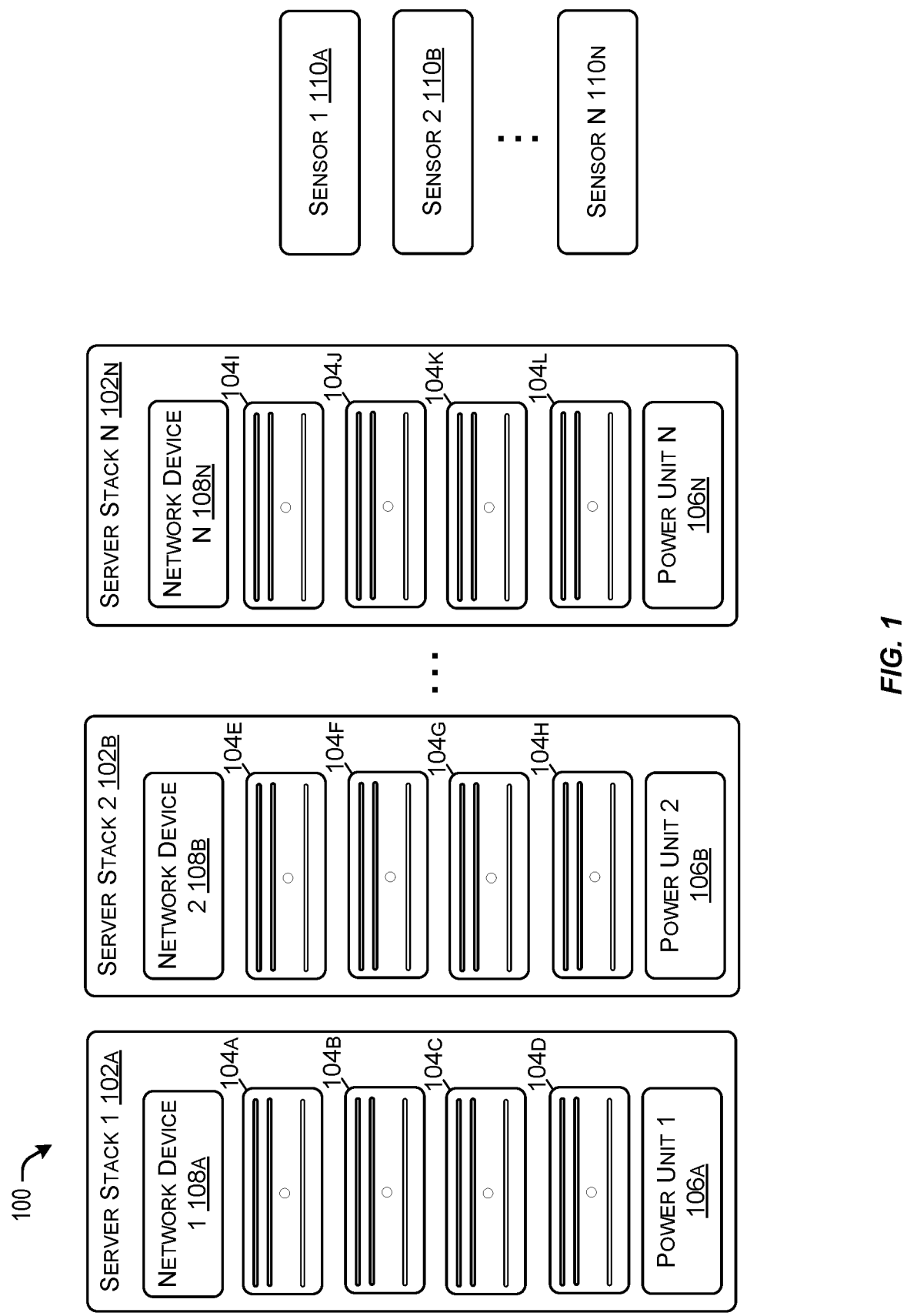
FIG. 1 is a block diagram of an example datacenter, according to at least one embodiment.

A datacenter can include a plurality of devices, such as computing devices, power sources providing power to the computing devices, network devices communicating data to/from the computing devices, and/or a plurality of sensors monitoring/controlling the environment in the datacenter. In many instances, an outage in the datacenter can occur, resulting in a loss of access to computing devices or associated processes implemented by the computing devices, or an inability to transfer data to/from devices in the datacenter, for example.

An outage in a datacenter can result from any of a variety of causes, such as a failure of a power source, a failure of one or more devices in the datacenter, overheating devices in the datacenter, an application failing to execute, etc. Particularly, as datacenters incorporate more devices, processing resources, and applications/services, efficiently identifying a source of the outage and performing a remedial process can be difficult, and an increased time to remedy the outage can result in lower user experience in interacting with devices/applications in the datacenter.

The present embodiments relate to data center outage detection and alert generation. Particularly, an outage detection service as described herein can process near real-time data from various sources in a datacenter and process the data using a model to determine one or more projected sources of a detected outage.

For example, an outage can be caused by a rack power source (e.g., powering a rack of servers) failing, leading to loss of functionality of the corresponding servers. In this event, the outage detection system as described herein can process the near real-time data using a model to identify one or more anomalous parameters. In this example, the model can identify a power level of the rack power source as dropping below a threshold level at a time near a time of detecting the outage or a power level of a server in the rack dropping below the threshold level. The model can process the near real-time input data using a set of rules to determine that the rack power source and/or the servers in the rack as projected sources of the outage.

An alert message can be generated to provide the projected sources of the outage and other data relevant to the outage. In the example above, the alert message can specify the rack power source and/or the servers in the rack as projected sources of the outage, the anomalous parameters identified by the model, a confidence value for each of the projected sources of the outage, etc. The alert message can provide insights into the outage and can efficiently rectify the outage.

Near real-time data can include environmental data from devices in the datacenter. Example near real-time data can include server temperatures, server/rack power usage, tickets obtained, sensor data, etc., that is stored with timestamps indicating a time of capturing the near-real time data. Responsive to an occurrence of an outage, the outage detection service can execute a model using the near-real time data and the offline data as an input to specify one or more projected sources of the outage.

The model as described herein can include one or more machine learning models incorporating a series of rules to process near-real time data and offline data and determine one or more projected sources of an outage. For instance, the model can identify one or more anomalous parameters of devices in the datacenter that have an increased likelihood of causing the outage. The model can output one or more projected sources or causes of the output, such as specifying devices, power supplies, applications, etc., that likely caused the outage and a confidence value providing an estimated confidence in each projected source causing the output. The projected sources of the outage can provide detected patterns from the near real-time data to establish a correlation for a mass outage that can be used to inform a recovery for the outage. For instance, the projected sources of the outage can provide a blueprint of how the outage (and any related issues) spread across components/applications within the datacenter. Utilizing the projected sources of the outage as a blueprint to recover from the outage can reduce an overall time of detecting and resolving the outage.

As an illustrative example, an outage can be detected in the datacenter either from an indication from an operator or automatically by the outage detection system (e.g., by detecting anomalous parameters, by detecting a number of incoming tickets specifying an outage). For example, the outage can be caused by a server rack losing functionality due to an anomalous increase in power from a rack power source in the server rack, leading to overheating servers in the server rack.

In this example, the outage detection service can obtain data (e.g., near real-time data 202) relating to server temperatures (e.g., 206), rack power usage (e.g., 210), ticketing data (e.g., 212), etc., and arrange the data by timestamps for processing by a model. The model can process the obtained data to identify anomalous parameters that can be indicative of a cause of the outage. For example, a plurality of received tickets can specify an outage occurred at a first time instance. Additionally, at the first time instance, a rack power metric for the rack power source can have an anomalous increase, and fan speeds for the servers in the rack can increase (indicative of a core server temperature increase) at the first time instance.

In this example, the model can identify that a first cause of the outage can comprise a power surge to the rack power source causing an overheating (and limited functionality) of servers in the rack. The model can use a series of rules to identify a likelihood that the cause of the outage is the power surge to the rack power source and a confidence value (e.g., as a percentage) can be assigned for the cause of the outage.

In this example, the outage detection service can provide resolution data providing one or more steps to resolve the cause of the outage. Example resolution data can specify to reset or replace the rack power source, or reset the servers in the rack. The outage detection service can output an alert comprising aspects of the outage, the projected cause of the outage, the resolution data, and/or one or more graphs illustrating anomalous parameters identified from obtained data from the datacenter.

FIG. 1 is a block diagram of an example datacenter 100. A datacenter 100 can include an environment (e.g., room, building) comprising a plurality of computing devices and associated devices to power the computing devices and facilitate data communication between the computing devices and devices external to the datacenter 100. The datacenter 100 can provide a controlled environment to maintain threshold environmental conditions (e.g., temperature, humidity) in the datacenter 100.

The datacenter 100 can include a number of server stacks 102*a-n* comprising computing devices (e.g., servers 104*a*-

1). A server stack (e.g., 102a-n) can include a rack arranging a set of servers 104a-1. Each server stack 102a-n can include one or more power supplies (e.g., power units 106a-n) and network devices (e.g., 108a-n) allowing for data transmission between devices in datacenter 100. In some embodiments, the outage detection service as described herein can be implemented on one or more computing devices (e.g., servers 104a-1) or computing device(s) external to the datacenter 100.

Each server 104a-1 in the datacenter 100 can implement applications/plugins/add-ons/virtual machines/etc. that are configured to perform various processing tasks, such as maintain and update databases, for example. The servers 104a-1 can include a number of sensors configured to capture data relating to each server, such as a core temperature, power usage, fan speed, state, etc., of each server 104a-1.

Each server 104a-1 can be connected to one or more power units 106a-n. Each power unit can be associated with a server stack 102a-n and can provide power to servers 104a-1. The power units 106a-n can monitor a plurality of power parameters (e.g., voltage, current) provided by each power unit 106a-n that can be provided as near real-time data to the outage detection service.

The servers 104a-1 can communicate data via network devices 108a-n. Network devices 108a-n can include a network switch, router, etc., that can forward data between servers 104a-1 and recipient devices. In some instances, network devices 108a-n can implement a streaming service providing low-latency data communication between servers 104a-1 and the outage detection service executing on a cloud infrastructure node as described herein.

The datacenter 100 can include a plurality of sensors 110a-n. Sensors 110a-n can monitor/control the environment of the datacenter 100. Example sensors can include temperature sensors, humidity sensors, pressure sensors, etc. The data captured by sensors 110a-n can be provided as the near real-time data to the outage detection service.

Figure 2:
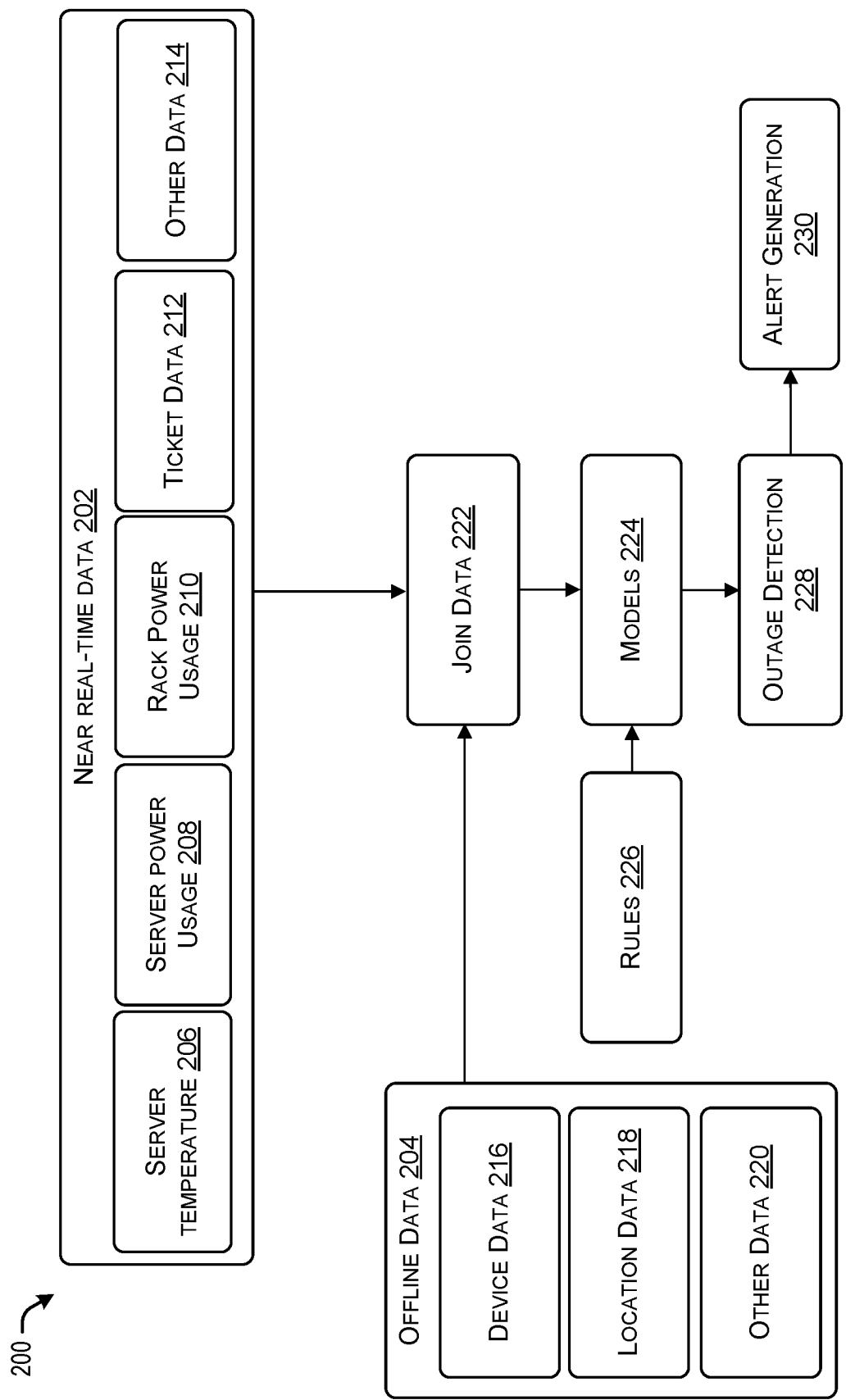
FIG. 2 is a flow diagram illustrating a method for generating an alert for an outage, according to at least one embodiment.

FIG. 2 is a flow diagram 200 illustrating a method for generating an alert for an outage. As described below, an alert can include a notification (e.g., a message, e-mail, text notification) provided to an operator of the datacenter providing insights into the outage and potential sources of the outage. The method for generating an alert for an outage can be performed by an outage detection service as described herein.

The outage detection service can obtain near real-time data 202 and offline data 204 from various sources. The near real-time data 202 and offline data 204 can be processed as input data to be processed using a model as described herein. The near real-time data 202 can include various data types, such as server temperature data 206, server power usage data 208, rack power usage data 210, ticket data 212, and any other data types 214. The outage detection service can obtain the near real-time data 202 from sources within the datacenter via a streaming service to provide low latency data communication to the outage detection service.

The server temperature data 206 can include data relating to an internal temperature of servers in the datacenter as provided by sensors (e.g., 110a-n) or the servers (e.g., 104a-n). The server temperature data 206 can specify server temperatures at a time instance, which can allow for monitoring of sever temperature trends over time. As described herein, an increased server temperature of one or more servers can indicate an increased power usage or overheating of the servers, which can be a cause of an outage. In some instances, server temperature data 206 can include fan speed data identifying fan speeds of the servers in the datacenter, which can indicate the temperature of the servers.

The server power usage data 208 can specify power consumption of each server in the datacenter. Example parameters relating to the server power usage data 208 can include a voltage, current, power draw, production load, etc., of each server during a time period. Various sensors can be disposed within or near the server to obtain the server power usage data 208.

The rack power usage data 210 can provide a power usage of servers (and/or accompanying devices) in a rack (e.g., server stacks 102a-n). The rack power usage can be provided by power source(s) (e.g., power units 106a-n) for the rack. The power units 106a-n can measure a plurality of electrical power parameters (e.g., voltage, current, power consumption for the rack and individual devices in the rack).

The ticket data 212 can include a series of tickets obtained by a ticket node (e.g., an application executing on a computing device to obtain tickets from devices in the datacenter or devices external to the datacenter). Tickets can be received for detected issues/alerts relating to devices or applications executing on devices in the datacenter. A ticket can be provided automatically by devices in communication with a device in the datacenter or manually by an operator interacting with a device in the datacenter.

As an example, a ticket can be automatically generated by a device when the device is unable to obtain data from an application executing on a first server in the dataset. As another example, a ticket can be generated by a client when the client is unable to access a database maintained by a second server in the datacenter via a client device. Tickets can be associated with a timestamp and can be used to identify an outage or a cause of an outage as described herein.

Other data 214 can include network data specifying data transmission characteristics of devices in the datacenter, application data parameters of applications executing on devices in the datacenter, logged changes to applications/devices in the datacenter, etc.

The outage detection service can also obtain offline data 204 from a data source, such as one or more databases containing static datacenter information. Examples of offline data 204 can include device data 216, location data 218, and other data 220. The device data 216 can specify a number of devices in the datacenter, and the location data 218 can include a location of each device in the datacenter. The device data 216 and location data 218 can identify groupings of devices in the datacenter, such as servers grouped in a rack. Other data 220 can specify applications executing on each server, capabilities of each device in the datacenter, software versions of each device, device types (e.g., sensor, network device, power device) in the datacenter, etc.

At 222, the near real-time data 202 and offline data 204 can be joined. This can include arranging data by datatype and storing the data in a data source (e.g., database, table) based on timestamps associated with the data. As data is acquired over time, a database/table can be populated by data type according to the time of receipt of the data. For example, server temperature data for a first server in the datacenter can be stored by time of acquiring the data, providing a temperature of the first server over a time period. As another example, a rack power usage can be stored to provide trends in the power usage of the rack over time. The trends and movements of the parameters provided in the received data can provide insights into anomalous parameters in the datacenter and potential causes of an outage in the datacenter.

In some embodiments, a predicted level for measured parameters in the datacenter can be generated based on historical levels in the datacenter. For instance, historical server temperature data can be captured over time, and a predicted temperature can be generated for each time instance. The predicted levels can be compared with corresponding parameters to detect any deviations from the predicted levels, which can be indicative of an anomaly that can be a source of an outage.

At 224, a model can be executed using the joined data to determine one or more projected causes of an outage. In some instances, the model can be executed responsive to detection of an outage (e.g., by manual indication by an operator, automatically detected by inspecting ticket data).

The model 224 can process the joined data as input parameters that can be used to detect anomalous behavior that can be indicative of a source of the outage. The model 224 can include a machine learning model that can incorporate a plurality of rules 226 to process the joined data (e.g., data joined at 222) and detect one or more projected sources of the outage.

The rules 226 can be generated from previously-identified outages and known resolutions to the outages. For example, if a previous outage was due to a power surge at a rack power source, a new rule can include instructions monitoring for a similar power surge at any power source and similar characteristics of the outage detected due to the power surge. The rules 226 can also be generated based on historical datacenter data or feedback data provided in response to resolving an outage.

For example, a rule 226 can include instructions to process an input parameter to determine whether the parameter has any anomalous characteristics at any point in time. Further, rules 226 can include instructions correlating an anomalous parameter with one or more devices as projected source of an outage and identify one or more devices impacted by the anomalous parameter.

In a first example, the model can use a first rule to determine whether server power data for a first server includes any anomalous characteristics. For instance, a rule 226 can provide instructions for the model to compare the server power data for the first server with a predicted power levels to detect any deviation between the actual power level and a predicted power level. The rule can specify that when an actual power level exceeds a threshold deviation from a predicted power level at a time instance, the model 224 can identify the server power level for the first server being an anomalous parameter.

As another example, a rule 226 can include instructions to identify any modifications to applications/software for devices in the datacenter that occurred within a threshold time of detecting the outage (e.g., receiving tickets indicating an outage). For example, if an add-on caused an outage, the rule can identify any implemented changes to software in the datacenter that occurred within a threshold time of detecting the outage. In this example, the rule can identify the add-on implemented at a similar time instance as the time of detecting the outage, thus comprising a potential source of the outage.

Subsequent rules can process the anomalous characteristics to determine one or more projected sources of the outage. A rule 226 can include instructions to correlate an anomalous characteristic to a corresponding device/series of devices/applications/etc. For example, when a power level of a first rack power source spikes above a predicted level, the rule can identify that servers connected to the first rack power source have an increased likelihood of causing the outage due to the increased power level potentially resulting in a loss of functionality. As another example, when a threshold number of tickets specify that a first application has failed, a rule can identify all servers implementing the first application (or a virtual machine implementing the first application) can include projected sources of the outage. A plurality of rules can be executed by the model in combination to determine projected sources of the outage.

In many instances, multiple rules can be combined using the model to determine a likelihood of each projected source comprising an actual source of the outage. The likelihood of each projected source comprising an actual source of the outage can be represented in a confidence level. The confidence level can specify, for example, but is not limited to, a strength of a correlation, a lower false positive ratio, or a higher true positive ratio between each projected source of the outage with an actual source of the outage based on the near real-time data. For instance, a confidence level can be derived for each projected source of the outage based on a number of rules identifying each source as a projected source of the outage. The confidence level can be derived based on a number of executed rules that identify each device/application as the projected source of the outage.

For example, a first projected source of the outage can include a server and a second projected source of the outage can include a network switch communicating data to/from the server. In this example, two rules implemented by the model can specify the server as the first projected source of the outage (e.g., a rule identifying an anomalous temperature level of the server, a rule identifying a loss of functionality of an application executing on the server). Further, in this example, a single rule can specify the network switch as a second projected source of the outage (e.g., a rule identifying a data communication throughput from a port corresponding with the server lower than a predicted level). In this example, the first projected source of the outage can include a higher confidence level than that of the second projected source of the outage.

At 228, an outage can be detected. An outage can include any identified loss of functionality implemented by any device(s) in the datacenter. Example outages can result from overheating servers, an application executed on servers being unavailable, a lack of data communication with a server/application executing on the server, etc.

In some embodiments, the outage can be detected manually, by an operator indicating that an outage has occurred. In other embodiments, the outage can be detected automatically, such as by processing tickets or other near real-time data to detect a loss of functionality or data communication with a device/application in the datacenter, for example. A model can be configured to process input data to detect an outage. The process for deriving one or more projected sources of an outage can be performed responsive to detecting the outage.

At 230, an alert can be generated. An alert can provide a notification to an operator specifying the outage, one or more potential sources of the outage, and any known resolutions to the outage. For example, an alert can provide a description of the outage, one or more potential sources of the outage (e.g., as derived from model 224), any resolution data for resolving the outage, a depiction of one or more parameters evidencing the potential source of the outage, etc. An alert is discussed in greater detail with respect to FIG. 4.

Figure 3:
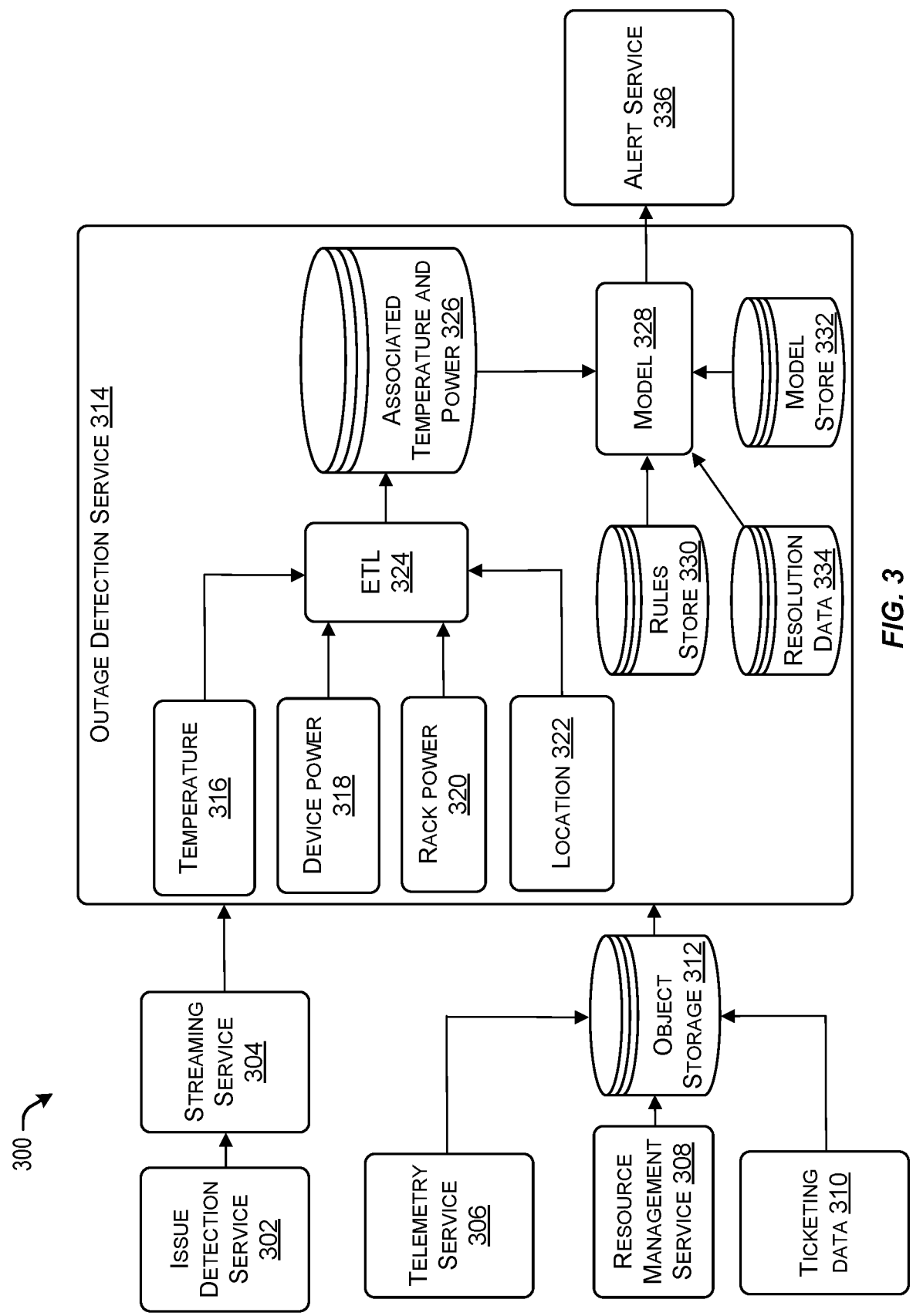
FIG. 3 is a block diagram illustrating an example outage detection service, according to at least one embodiment.

FIG. 3 is a block diagram 300 illustrating an example outage detection service 314. As noted above, the outage detection service 314 can be implemented on one or more interconnected computing devices external to the datacenter. The outage detection service 314 can obtain input parameters (e.g., near real-time data, offline data) and process the parameters using a model to derive one or more projected sources of an outage as described herein.

The outage detection service 314 can obtain near real-time data from an issue detection service 302. The issue detection service 302 can obtain near real-time data (e.g., server temperature data, rack power usage data, datacenter sensor data). The issue detection service 302 can provide any near real-time data 202 as described with respect to FIG. 2. In some instances, the issue detection service 302 can classify the near real-time data by data type for subsequent storage and processing by the outage detection service 314.

The near real-time data sent by issue detection service can be forwarded to the outage detection service 314 via a streaming service 304. The streaming service 304 can allow for data transmission with reduced latency between issue detection service 302 and outage detection service 314. For instance, streaming service 304 can include an API providing low latency connection between issue detection service 302 and outage detection service 314.

A telemetry service 306 can generate and provide a series of power-related parameters of power sources in the datacenter to the outage detection service 314. For instance, the telemetry service 306 can provide a plurality of power parameters (e.g., voltage, current, resistance, power) for each power source (e.g., rack power units 106a-n).

A resource management service 308 can monitor and track components in the datacenter and a location of each component in the datacenter. For instance, the resource management service 308 can maintain a listing of a location and identifier of each server in each rack in the datacenter and all power sources providing power to corresponding servers. The resource management service 308 can maintain a listing of a location of any device in the datacenter, applications executing on each server in the datacenter, all devices directly connected to other devices in the datacenter, etc.

A ticketing data service 310 can obtain and process tickets received relating to the datacenter. For example, responsive to an application failing to execute or provide data to external devices, tickets can be generated specifying the failure. As another example, a client can request a ticket be generated responsive to an application or a device failing to provide a specified functionality. The ticketing data service 310 can aggregate and identify features of each received ticket. As described herein, the ticketing data service 310 can parse features from each received ticket to identify specific applications/devices/etc., which can provide insights into projected causes of an outage. Data obtained from the telemetry service 306, resource management service 308, and ticketing data 310 can be stored in an object storage 312. The object storage 312 can include a database arranging the received data by data type and a time of obtaining the data.

The outage detection service 314 can obtain near real-time data (e.g., temperature data 316, device power data 318, rack power data 320, location data 322) and arrange the data by data type. For example, the near-real time data can be processed to identify features associated with each portion of data, such as a data type (e.g., temperature, power), devices/components related to each portion of data, a time of acquiring the data, etc.

The outage detection service 314 can implement an extract, transform, and load (ETL) process 324 to move and transform received data (e.g., temperature data 316, device power data 318, rack power data 320, location data 322). For example, the ETL 324 can obtain the near real-time data and identify a data type relating to each portion of data. The ETL 324 can also associate devices/components with various portions of data (e.g., using a listing of devices from resource management service 308) and assign timestamps to the portions of data. The processed data can be stored in a database 326 providing associated temperature and power data.

The outage detection service 314 can process the stored data (e.g., stored in database 326) using a model 328 to derive one or more projected sources of the outage. In some embodiments, the model 328 can process input data and determine whether an outage has occurred and/or identify features relating to the outage (by processing ticket data, by identifying anomalous parameters of near real-time data).

The model 328 can be retrieved from a model store 332 that can store various machine-learning model types. The model 328 can incorporate various rules from a rule store 330 to be executed by the model. For instance, the rules can identify anomalous parameters (e.g., a threshold deviation of a parameter from a predicted level at a time instance), identify devices that correspond to an anomalous parameter, a device/application relating that corresponds to received tickets, etc. The model 328 can output one or more projected sources of the outage and a confidence level specifying a confidence that the projected source of the outage corresponds to the outage. For example, the model can process near real-time data to identify a power surge at a first power source and determine that a projected source of the outage includes the first power source using the rules from the rules store 330. In some instances, data from previous outages (e.g., anomalous parameters from the outage, a known resolution to the outage) can be fed back into the model store 332/rules store 330 to incrementally add rules for identifying sources of an outage.

In some embodiments, the outage detection service 314 can identify resolution data that corresponds with a projected source of the outage. For example, if the model 328 identifies a first power source as a projected source of the outage, the outage detection service 314 can retrieve resolution data from resolution data database 334 to obtain corresponding resolution data (e.g., reset power source, replace power source). As another example, if the model 328 identifies a newly modified application executing on a series of services as a projected source of the outage, the outage detection service 314 can retrieve resolution data from resolution data database 334 to obtain corresponding resolution data (e.g., revert modifications to application).

The outage detection service can generate an alert via an alert service 336. The alert can provide a message describing the outage, the projected sources of the outage, a confidence value associated with each projected source of the outage, resolution data associated with each projected source of the outage, etc.

Figure 4:
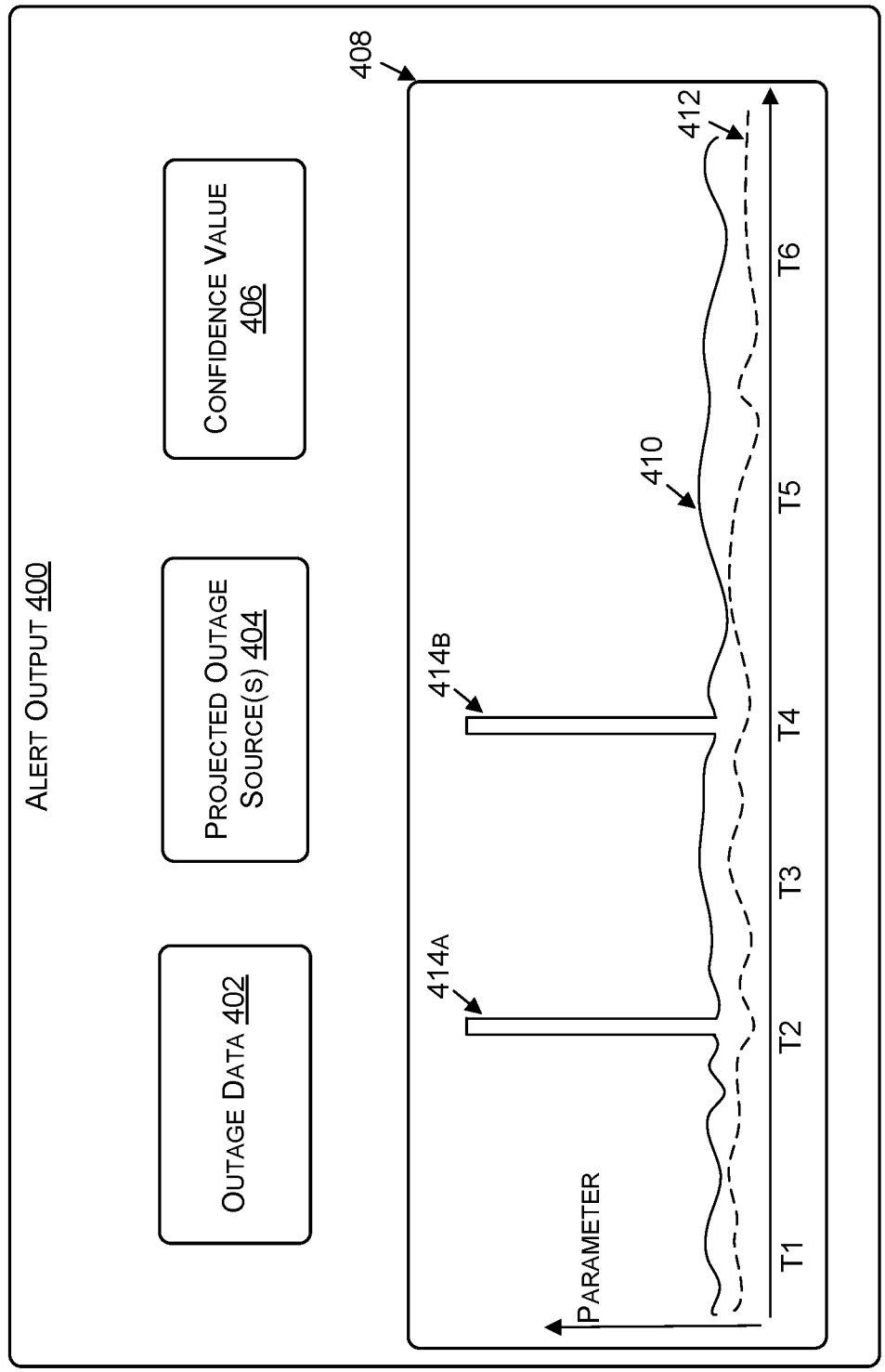
FIG. 4 illustrates an example alert, according to at least one embodiment.

FIG. 4 illustrates an example alert 400. The alert 400 can include a message (e.g., email message, text message, a graphical output on a device associated with an operator). The alert 400 can provide multiple sources of data relating to the outage. For example, the alert 400 can provide outage data 402 specifying features of the outage (e.g., a time of detecting the outage, devices/applications affected due to the outage). The outage data 402 can include data provided by a client or operator, data derived from model(s) identifying aspects of the outage, etc.

The alert 400 can provide projected outage source(s) 404 that specify one or more projected sources of the outage. For example, the alert can provide a listing of projected sources of the outage (e.g., 404) and data points identifying each source as a projected source of the outage (e.g., anomalous parameters, ticket data). The alert 400 can also include one or more confidence value(s) 406 associated with each projected source of an outage specifying an estimated likelihood of each projected source of an outage actually comprising the source of the outage.

The alert 400 can provide a graphical representation 408 of one or more parameters corresponding to a projected source of the outage. For example, if a projected source of an outage is a rack power source, the alert 400 can include a graphical representation 408 of a power parameter. In this example, the graphical representation 408 can provide an actual power level 410 in comparison with a predicted power level 412 (e.g., derived from historical power levels) over a time duration (e.g., time instances T1-T6). Further, in this example, the graphical representation 408 can illustrate multiple anomalous deviations 414a-b in the power level from the predicted power level 412. The multiple anomalous deviations 414a-b in the power level can provide an insight that a power source associated with the power level 410 was a source of the outage.

Figure 5:
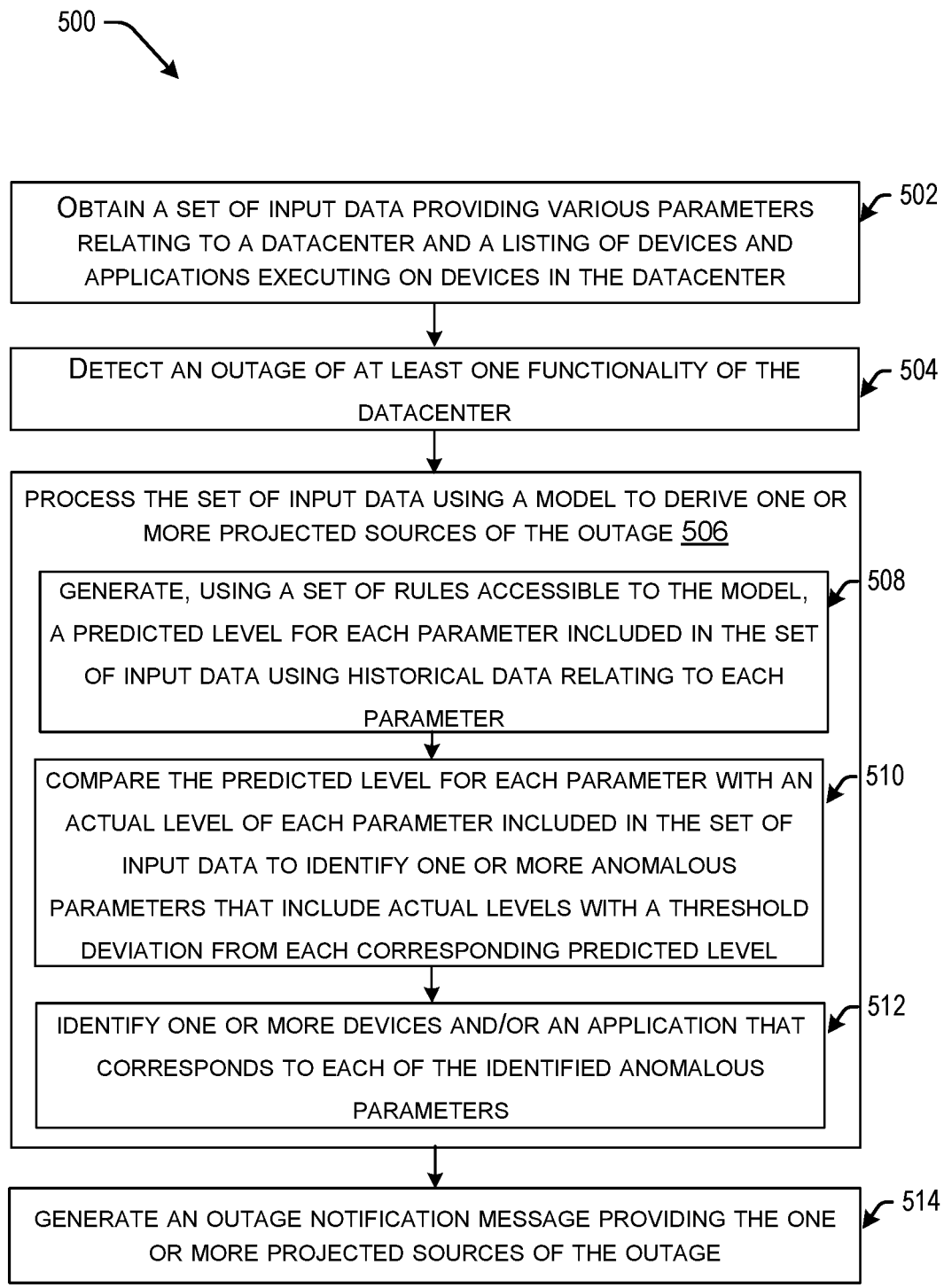
FIG. 5 is a block diagram of an example method for deriving one or more projected sources of an outage in a datacenter, according to at least one embodiment.

FIG. 5 is a block diagram 500 of an example method for deriving one or more projected sources of an outage in a datacenter. A cloud infrastructure node can implement an outage detection service configured to perform the method as described herein.

At block 502, the method can include obtaining a set of input data providing various parameters relating to a datacenter and a listing of devices and applications executing on devices in the datacenter. The set of input data can include the near real-time data (e.g., 202) and offline data (e.g., 204) as described with respect to FIG. 2 above. In some embodiments, the set of input data can specify any of: a temperature of each server in the datacenter, a power level of each power source in each rack of the datacenter, climate data of the datacenter obtained from a series of sensors in the datacenter, obtained ticket data identifying any functionalities of the datacenter, a listing of devices in the datacenter, and a location of all devices in the datacenter.

In some embodiments, the set of input data includes a location of each of the devices in the datacenter and a device type of each device in the datacenter. The method can include processing the set of input data to identify a data type and one or more associated devices relating to each portion of the set of input data. Example data types can include server temperature data (e.g., 206), server power usage data (e.g., 208), device data (e.g., 216), etc. The method can also assign a timestamp indicating a time of obtaining each portion of the set of input data to each portion of the set of input data. The outage detection service can arrange data of a specific type by timestamps to derive trends in parameters over a time duration (e.g., to identify changes in a parameter over time). The method can also include storing the set of input data in a database (e.g., database 326) by data type and assigned timestamp. The outage detection service can use the stored data as an input to the model to derive the projected source(s) of the outage.

At block 504, the method can include detecting an outage of at least one functionality of the datacenter. The outage can result from a loss of a functionality (e.g., an application) or a loss of computing resources (e.g., lost connection to server(s), loss of power to server(s)). Detecting the outage can include obtaining an outage notification from an external computing device specifying that the outage has occurred or detecting that a threshold number of obtained tickets are received that specify a loss of at least one functionality or the portion of computing resources at the datacenter.

At block 506, the method can include processing the set of input data using a model to derive one or more projected sources of the outage. The model can incorporate a plurality of rules specifying correlations between the set of input data and the devices or the applications executing on the devices as the one or more projected sources of the outage.

At block 508, deriving one or more projected sources of the outage can include generating a predicted level for each parameter included in the set of input data using historical data relating to each parameter using a set of rules accessible to the model. For example, historical server temperature data for a first server can be processed to determine a predicted temperature level for the first server. The predicted levels for each parameter can be compared with detected levels to identify whether any parameter deviates from the predicted level. Such deviations can be indicative of a device or application that is a projected source of the outage.

At block 510, deriving one or more projected sources of the outage can include comparing the predicted level for each parameter with an actual level of each parameter included in the set of input data to identify one or more anomalous parameters that include actual levels with a threshold deviation from each corresponding predicted level. For example, a parameter can be anomalous when an actual level of a parameter has a threshold deviation from a predicted level for that parameter. A parameter with a threshold deviation from a predicted level can be indicative of an overheating server, a power surge in a power source, a loss in network packets, etc.

At block 512, deriving one or more projected sources of the outage can include identifying one or more devices and/or an application that corresponds to each of the identified anomalous parameters. Each of the identified one or more devices and/or the application can be included as the one or more projected sources of the outage. For example, responsive to determining that a server temperature level of a first server suddenly rising above a predicted level, the model can identify the first server as a projected source of the outage.

In some embodiments, the set of rules are derived at least in part based on a correlation between previously-resolved outages and identified sources of each of the previously-resolved outages. In these embodiments, the method can include identifying, by the model using a first rule of the set of rules, which a first anomalous parameter relates to a first application executing on a portion of servers in the datacenter. For example, a change to an application executing on a set of servers can cause an update. In this example, the model can identify anomalous parameters relating to the application, such as an increased server temperature level, a loss in data packet transmission, etc.

In these embodiments, the method can also include identifying, by the model using a second rule of the series of rules, which a change to execution of the first application occurred within a threshold time duration of a time of detecting the outage. For example, the model can identify that the change to the application occurred within a time of detecting the outage (e.g., detecting that the change occurred less than five minutes from the time of detecting the outage). This can be indicative that the change to the application is a projected source of the outage. The first application can be included in the output notification message as a first projected source of the outage. The output notification message can further provide resolution data specifying instructions to revert the first application to a previous version to remove the change to the execution of the first application.

At block 514, the method can include generating an outage notification message providing the one or more projected sources of the outage. In some embodiments, the outage notification message includes a graphical representation of a first anomalous parameter and a derived predicted level of the first anomalous parameter.

In some embodiments, the method can include, for each of the one or more projected sources of the outage, deriving a confidence level based on a number of rules that correlate to parameters relating to each projected source of the outage, wherein the outage notification message includes the confidence level.

In some embodiments, the method can include, for each of the one or more projected sources of the outage, retrieving resolution data that relates to each of the one or more projected sources of the outage, the resolution data providing known methods for resolving the outage specific to each projected source of the outage, wherein the outage notification message includes the resolution data.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
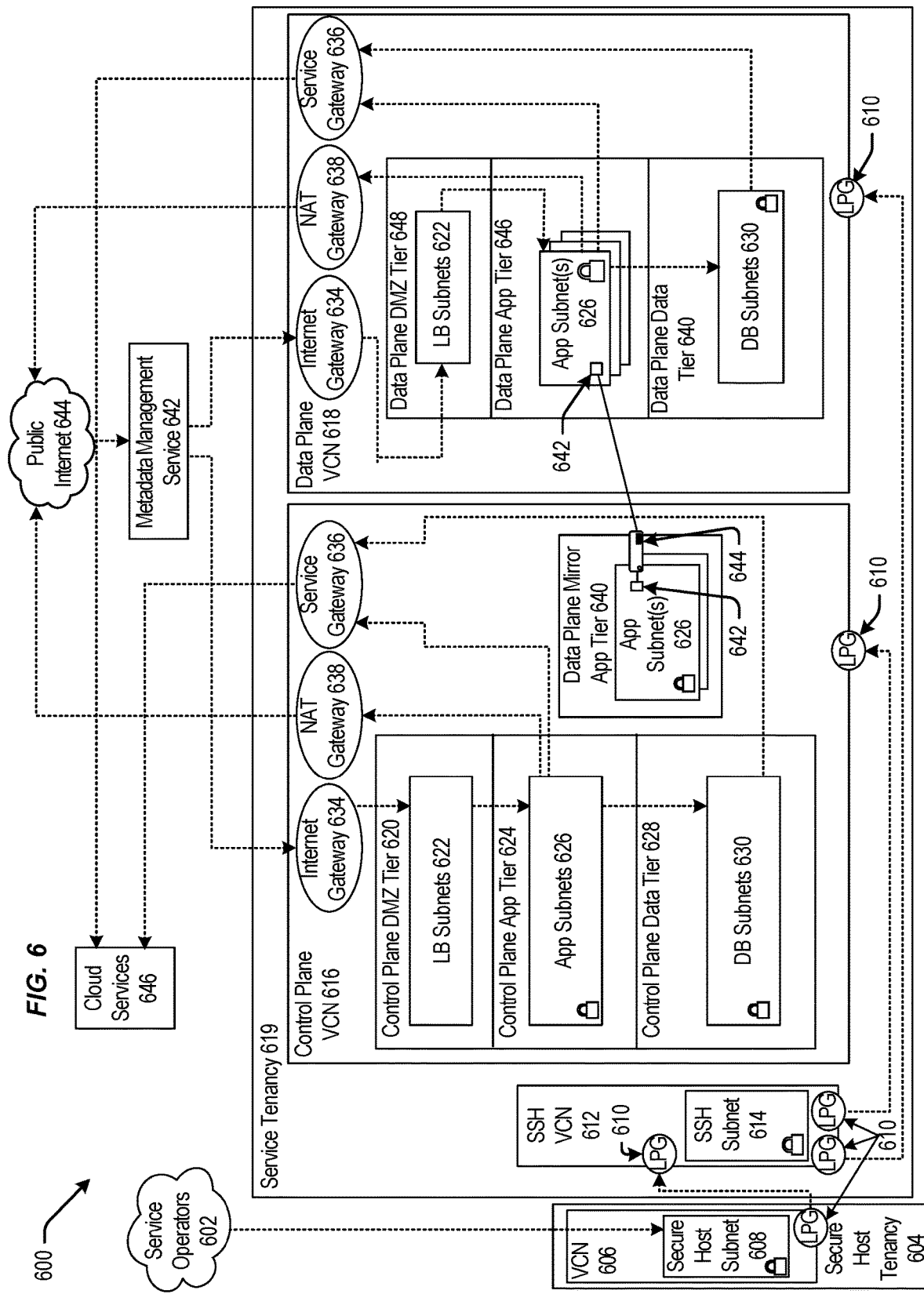
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
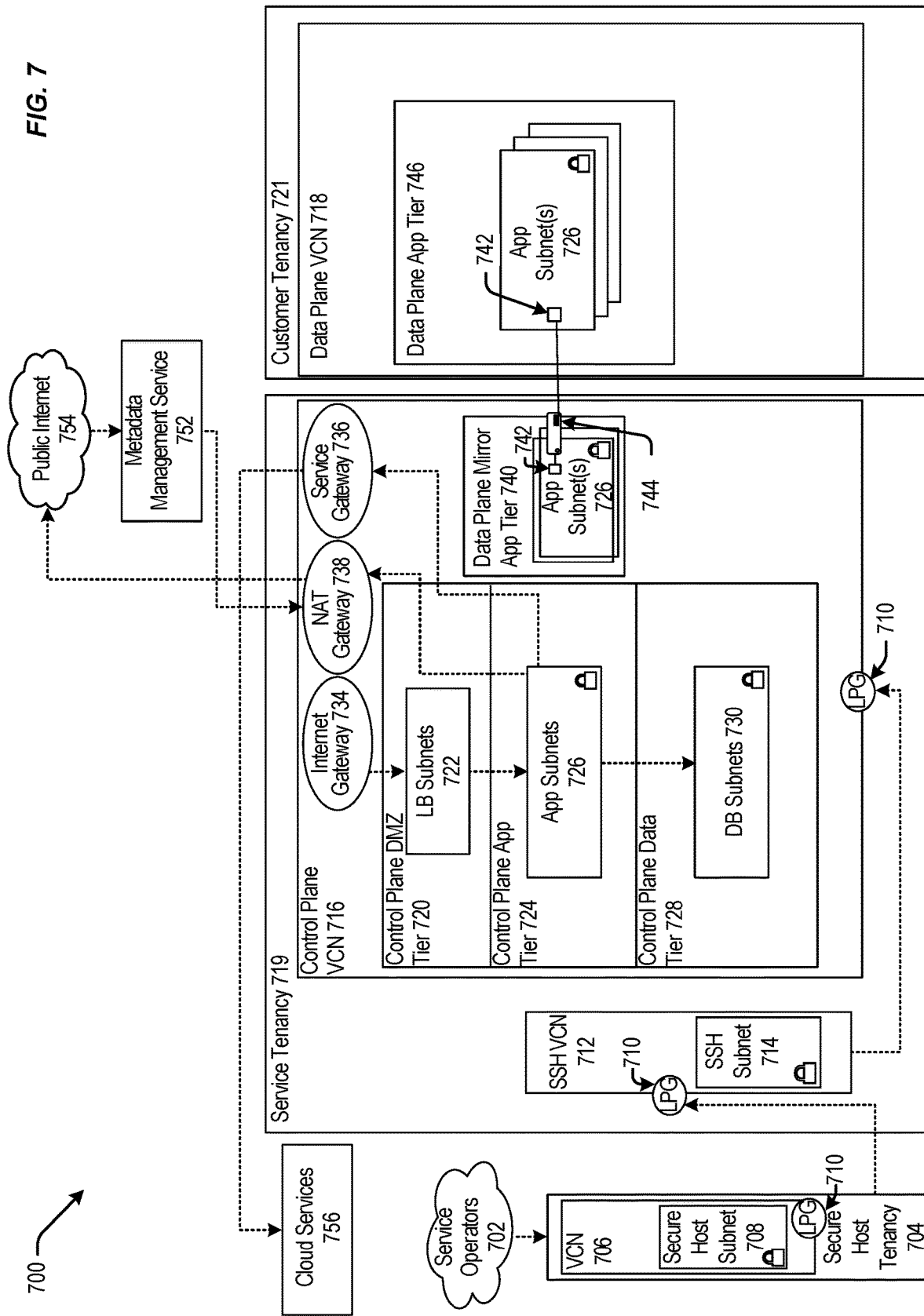
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
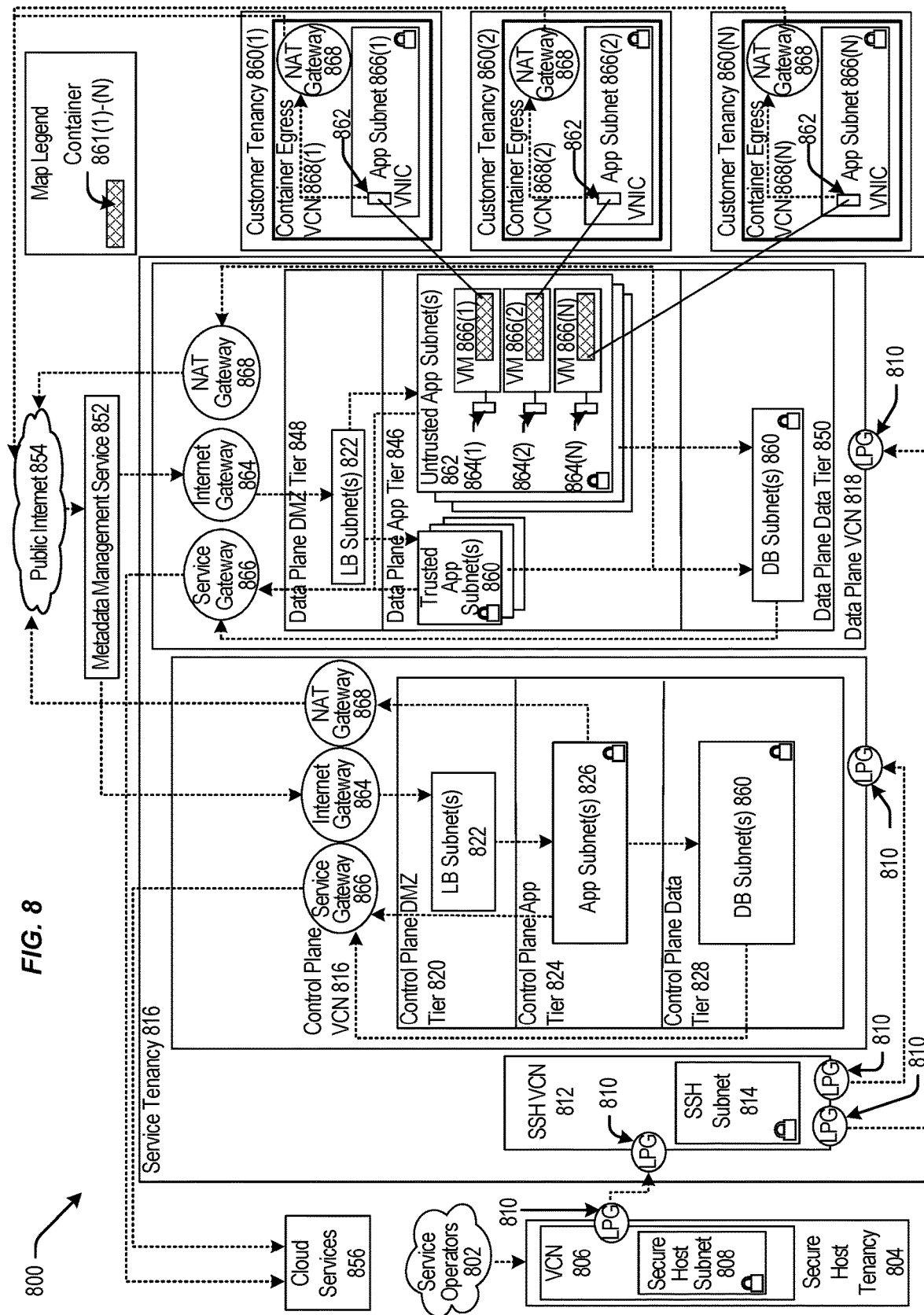
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
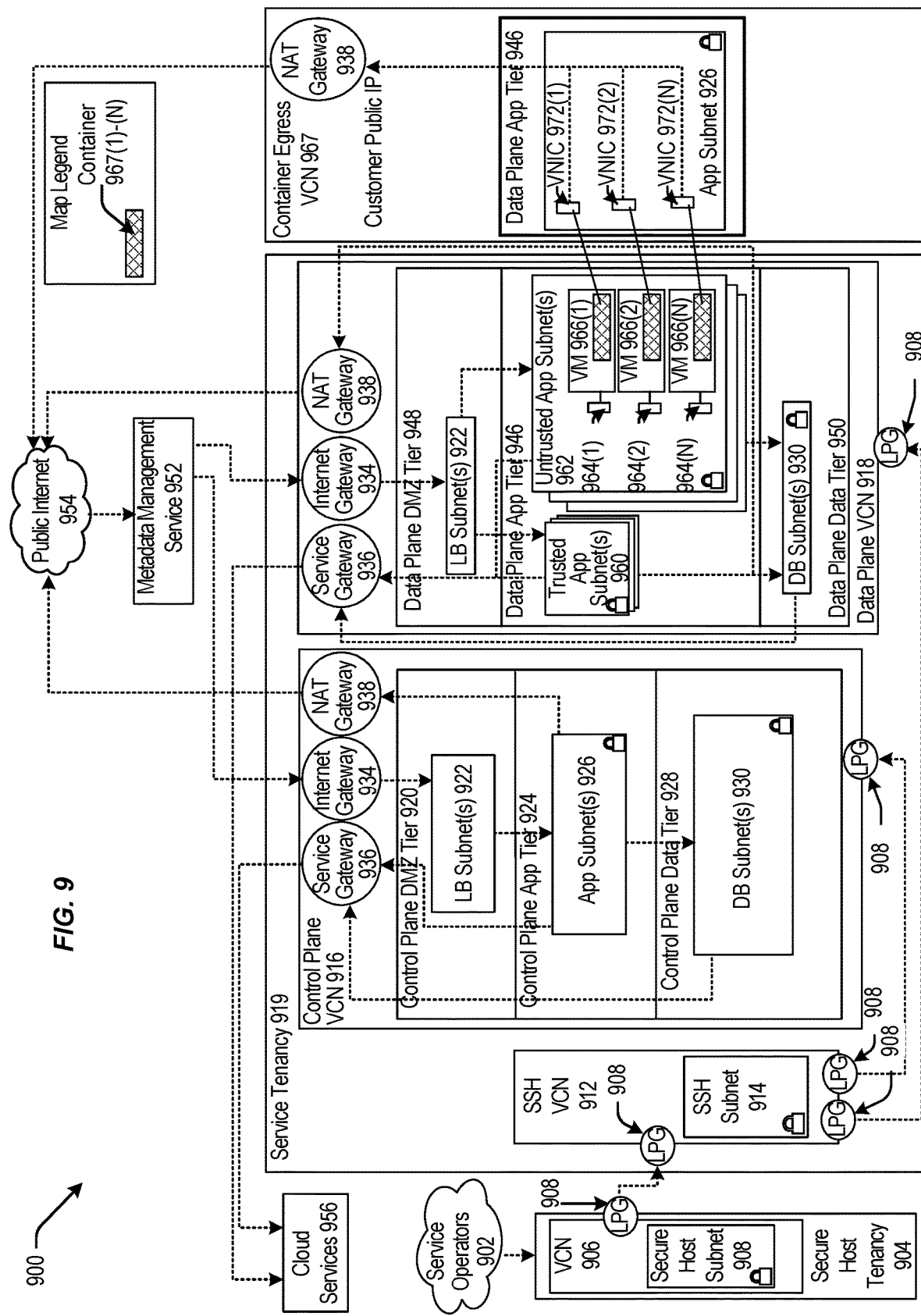
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
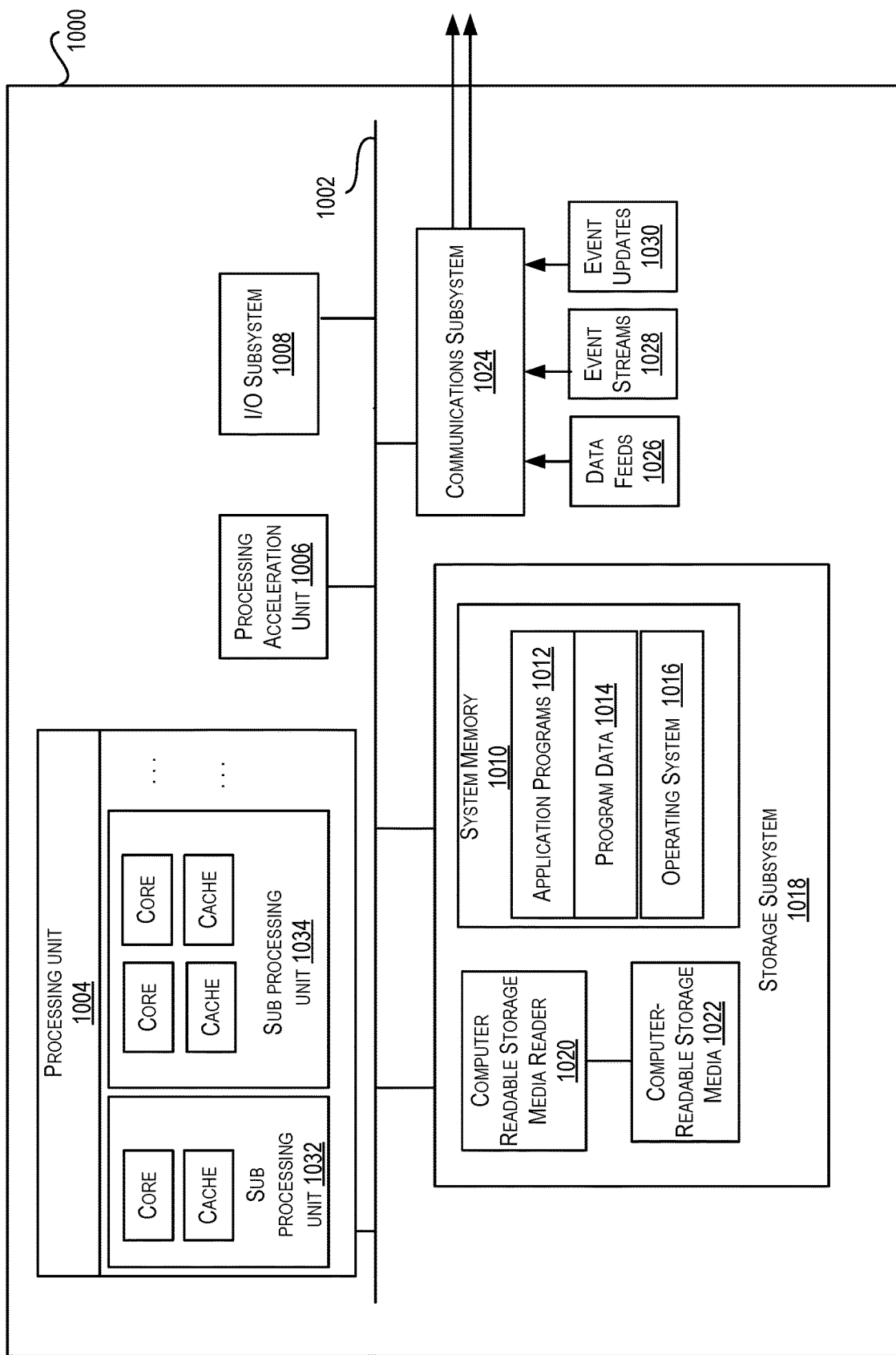
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method for deriving one or more projected sources of an outage in a datacenter, the method comprising:
   obtaining a set of input data providing various parameters relating to a datacenter and a listing of devices in the data center and applications executing on the devices in the datacenter, wherein the set of input data includes a location of each of the devices in the datacenter and a device type of each device in the datacenter;
   processing the set of input data to identify a data type and one or more associated devices relating to each portion of the set of input data;
   assigning, to each portion of the set of input data, a timestamp indicating a time of obtaining each portion of the set of input data;
   storing the set of input data in a database by data type and assigned timestamp;
   detecting an outage of at least one functionality of the datacenter based at least in part on the obtained set of input data;
   responsive to detecting the outage, processing the set of input data using a model to derive one or more projected sources of the outage, the model incorporating a set of rules specifying correlations between the set of input data and the devices or the applications executing on the devices as the one or more projected sources of the outage, wherein deriving the one or more projected sources of the outage includes:
     generating, using the set of rules accessible to the model, a predicted level for each parameter included in the set of input data using historical data relating to each parameter;
     comparing the predicted level for each parameter with an actual level of each parameter included in the set of input data to identify one or more anomalous parameters that include actual levels with a threshold deviation from each corresponding predicted level; and
     identifying one or more devices and/or an application that corresponds to each of the identified anomalous parameters, wherein each of the identified one or more devices and/or the application is included as the one or more projected sources of the outage; and
   generating an outage notification message providing the one or more projected sources of the outage based at least in part on processing the set of input data.

2. The method of claim 1, wherein the set of input data specifies any of: a temperature of each server in the datacenter, a power level of each power source in each rack of the datacenter, climate data of the datacenter obtained from a series of sensors in the datacenter, obtained ticket data identifying any functionalities of the datacenter, a listing of devices in the datacenter, and a location of all devices in the datacenter.

3. The method of claim 1, wherein detecting the outage further comprises:
   obtaining an outage notification from an external computing device specifying that the outage has occurred; or
   detecting that a threshold number of obtained tickets are received that specify a loss of at least one functionality or a portion of computing resources at the datacenter.

4. The method of claim 1, wherein the outage notification message includes a graphical representation of a first anomalous parameter and a derived predicted level of a first anomalous parameter.

5. The method of claim 1, further comprising:
   for each of the one or more projected sources of the outage, deriving a confidence level based at least in part on a number of rules that correlate to parameters relating to each projected source of the outage, wherein the outage notification message includes the confidence level.

6. The method of claim 5, wherein each of the one or more projected sources of the outage and the confidence level for each of the one or more projected sources of the outage correlate anomalous aspects of the set of input data with devices or applications in the datacenter such as to provide insights into an actual source of an outage.

7. The method of claim 1, further comprising:
   for each of the one or more projected sources of the outage, retrieving resolution data that relates to each of the one or more projected sources of the outage, the resolution data providing known methods for resolving the outage specific to each projected source of the outage, wherein the outage notification message includes the resolution data.

8. A cloud infrastructure node, comprising:
   a processor; and
   a non-transitory computer-readable medium including instructions that, when executed by the processor, cause the processor to:
     obtain a set of input data providing various parameters relating to a datacenter and a listing of devices in the data center and applications executing on the devices in the datacenter, wherein the set of input data includes a location of each of the devices in the datacenter and a device type of each device in the datacenter;
     process the set of input data to identify a data type and one or more associated devices relating to each portion of the set of input data;
     assign, to each portion of the set of input data, a timestamp indicating a time of obtaining each portion of the set of input data;
     store the set of input data in a database by data type and assigned timestamp;
     detect an outage of a functionality of the datacenter based at least in part on the obtained set of input data;
     responsive to detecting the outage, process the set of input data using a model to derive one or more projected sources of the outage, the model incorporating a set of rules specifying correlations between the set of input data and the devices or the applications executing on the devices as the one or more projected sources of the outage; and
     generate an outage notification message providing the one or more projected sources of the outage based at least in part on the deriving.

9. The cloud infrastructure node of claim 8, wherein the non-transitory computer-readable medium further causes the processor to:
   identify, by the model using a first rule of the set of rules, that a first anomalous parameter relates to a first application executing on a portion of servers in the datacenter;
   identify, by the model using a second rule of the set of rules, that a change to execution of the first application occurred within a threshold time duration of a time of detecting the outage, wherein the first application is included in the outage notification message as a first projected source of the outage, wherein the outage notification message further provides resolution data specifying instructions to revert the first application to a previous version to remove the change to the execution of the first application.

10. The cloud infrastructure node of claim 8, wherein detecting the outage further comprises:
obtain an outage notification from an external computing device specifying that the outage has occurred; or
detect that a threshold number of obtained tickets are received that specify a loss of at least one functionality or a portion of computing resources at the datacenter.

11. The cloud infrastructure node of claim 8, wherein the non-transitory computer-readable medium further causes the processor to:
for each of the one or more projected sources of the outage, derive a confidence level based at least in part on a number of rules of the set of rules that correlate to parameters relating to each projected source of the outage, wherein the outage notification message includes the confidence level.

12. The cloud infrastructure node of claim 8, wherein processing the set of input data using the model to generate the one or more projected sources of the outage further comprises:
generating a predicted level for each parameter included in the set of input data using historical data relating to each parameter;
comparing the predicted level for each parameter with an actual level of each parameter included in the set of input data to identify one or more anomalous parameters that include actual levels with a threshold deviation from each corresponding predicted level; and
identifying a device or series of devices that correspond to each of the identified anomalous parameters, wherein each of the identified devices or series of devices are included as the one or more projected sources of the outage.

13. A non-transitory computer-readable medium including stored thereon a sequence of instructions which, when executed by a processor causes the processor to execute a process, the process comprising:
obtaining a set of input data providing various parameters relating to a datacenter and a listing of devices in the data center and applications executing on the devices in the datacenter, wherein the set of input data includes a location of each of the devices in the datacenter and a device type of each device in the datacenter;
processing the set of input data to identify a data type and one or more associated devices relating to each portion of the set of input data;
assigning, to each portion of the set of input data, a timestamp indicating a time of obtaining each portion of the set of input data;
storing the set of input data in a database by data type and assigned timestamp;
detecting an outage at the datacenter based at least in part on the obtained set of input data;
deriving, by a model using the set of input data, one or more projected sources of the outage, wherein deriving the one or more projected sources of the outage includes:
comparing a predicted level for each parameter with a derived level of each parameter included in the set of input data to identify one or more anomalous parameters that include derived levels with a threshold deviation from each corresponding predicted level; and
identifying one or more devices and/or an application that corresponds to each of the identified anomalous parameters, wherein each of the identified one or more devices and/or the application is included as the one or more projected sources of the outage; and
generating an outage notification message providing the one or more projected sources of the outage based at least in part on the deriving.

14. The computer-readable medium of claim 13, wherein the set of input data specifies any of: a temperature of each server in the datacenter, a power level of each power source in each rack of the datacenter, climate data of the datacenter obtained from a series of sensors in the datacenter, obtained ticket data identifying any functionalities of the datacenter, a listing of devices in the datacenter, and a location of all devices in the datacenter.

15. The computer-readable medium of claim 13, wherein the outage notification message includes a graphical representation of a first anomalous parameter and a derived predicted level 3 of the first anomalous parameter.

16. The computer-readable medium of claim 13, wherein the process further comprises:
for each of the one or more projected sources of the outage, deriving a confidence level based at least in part on a number of rules that correlate to parameters relating to each projected source of the outage, wherein the outage notification message includes the confidence level.

17. The computer-readable medium of claim 13, wherein the process further comprises:
for each of the one or more projected sources of the outage, retrieving resolution data that relates to each of the one or more projected sources of the outage, the resolution data providing known methods for resolving the outage specific to each projected source of the outage, wherein the outage notification message includes the resolution data.

* * * * *